Sept. 20, 1971 H. NUSBAUM 3,606,244
BREAKAWAY COUPLING VALVE
Filed Oct. 24, 1969 2 Sheets-Sheet 1
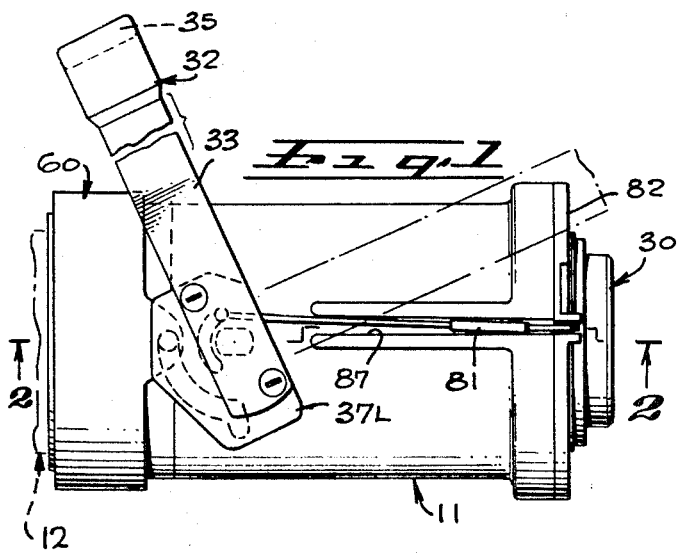
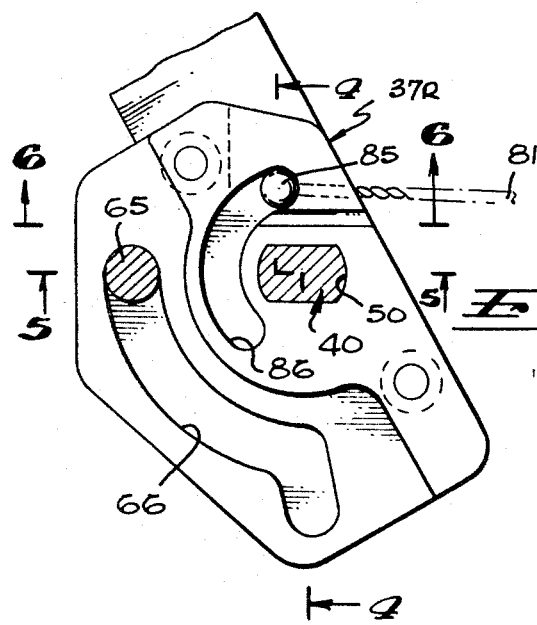
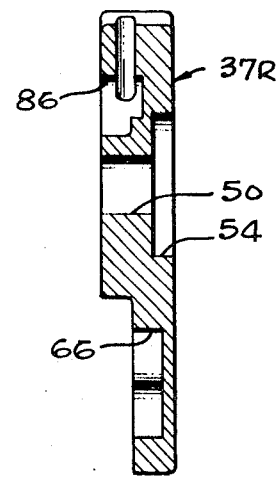
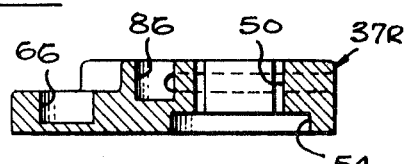
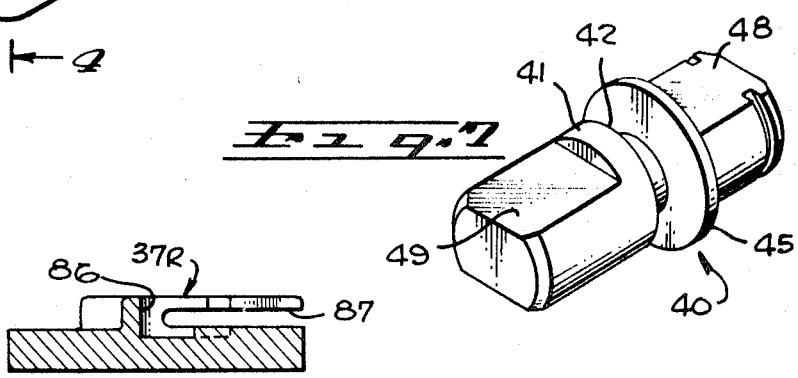
INVENTOR
HENRY NUSBAUM
BY
Mason & Graham
ATTORNEYS Sept. 20, 1971          H. NUSBAUM          3,606,244
BREAKAWAY COUPLING VALVE
Filed Oct. 24, 1969          2 Sheets-Sheet 2
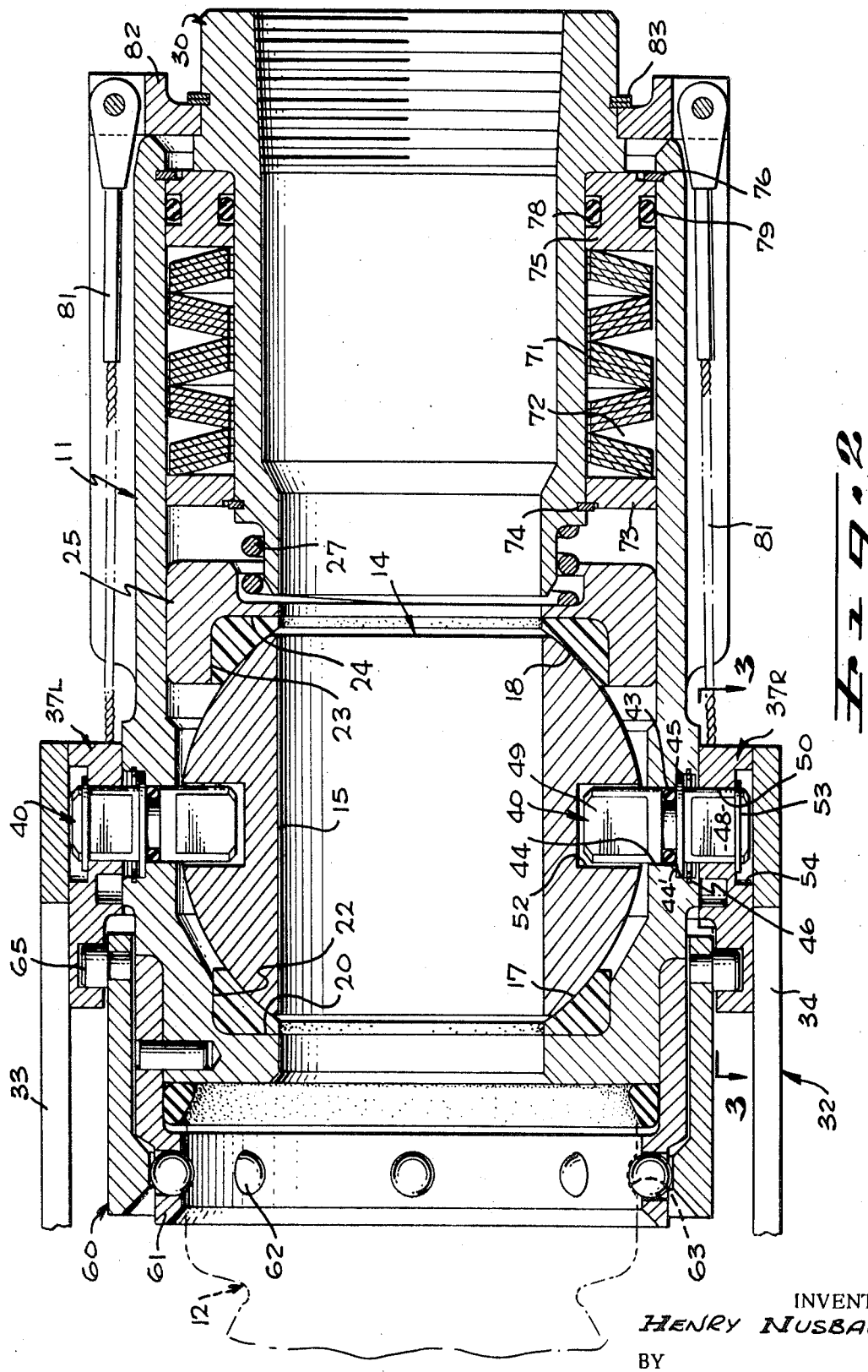
INVENTOR
*Henry Nusbaum*
BY
*Mason & Graham*
ATTORNEYS United States Patent Office 3,606,244
Patented Sept. 20, 1971

3,606,244
BREAKAWAY COUPLING VALVE
Henry Nusbaum, Los Angeles, Calif., assignor to The Rucker Company, Roylyn Division, Glendale, Calif.
Filed Oct. 24, 1969, Ser. No. 869,204
Int. Cl. F16l *37/28*
U.S. Cl. 251—149.9                    9 Claims

ABSTRACT OF THE DISCLOSURE

The application discloses a valve body embodying coupling means at one end for detachably connecting it to a nipple or the like, a valve member, a manually operable common actuator means for the valve and the coupling means for operating these in sequence, together with a spring-loaded breakaway mechanism for operating the actuator means when the device is subjected to a predetermined axial load.

---

The invention has to do generally with coupling valves and more particularly with such valves as embody mechanisms whereby the valve can be automatically uncoupled in response to being subjected to an axial load of predetermined force.

An object of the invention is to provide a breakaway valve having a novel construction which provides the capability to couple with a mating nipple while under pressure, be actuated, remain locked on and maintain a leakproof union while transferring various fluids over a relatively wide temperature range.

Another object is to provide a novel valve of the type indicated which can be actuated under high pressure with very low torque and because of full orifice opening produces minimal pressure loss during fluid transfer. In this connection it is an object to provide a valve in which a very low actuating torque is accomplished by the use of novel contoured bearing seals which are preloaded against a ball type valve by means of a compression spring.

A further object is to provide novel key elements for actuating the valve member which compensate for misalignment of the member.

Another object is to provide a novel valve of the type indicated which has a breakaway capability without damaging any of the components or becoming inoperative. In this connection it is an object to provide a valve in which the unit will close, uncouple and separate from the mating nipple when a pre-established axial breakaway load is applied without changing its operational or physical characteristics.

A further object is to provide such a valve which, after having separated in a breakaway operation, can be recoupled and opened to flow without any resetting.

The invention may be summarized as a valve body having a coupling means at one end, a valve member within the body, a manually operable actuating member connected to operate both the coupling means and the valve member in sequence, together with a pre-loaded axially movable breakaway mechanism attached to the actuator so as to operate it under a condition where the predetermined breakaway force is encountered.

These and other objects will be apparent from the drawings and the following description. Referring to the drawings:

FIG. 1 is an elevational view of a valve embodying the invention;

FIG. 2 is a longitudinal sectional view on line 2—2 of FIG. 1, but on a larger scale;

FIG. 3 is a fragmentary sectional view on line 3—3 of FIG. 2;

FIGS. 4, 5 and 6 are sectional views of the cam plate only on lines 4—4, 5—5 and 6—6, respectively of FIG. 3; and FIG. 7 is an isometric view of a key.

More particularly describing the invention, numeral 11 designates the valve body and 12 designates a nipple or fitting to which the body is shown coupled. The body 11 is tubular and open ended and houses a ball valve member 14. The latter is provided with a bore 15 therethrough which serves as a fluid passage when the valve is open as shown. The valve member is floatingly supported within the body between a pair of specially contoured seal rings 17 and 18 of Teflon or other suitable material. Ring 17 is supported by the inner face 20 of an inwardly extending flange 21 and by counterbore surface 22 of the body. The other seal ring is supported by the surfaces 23 and 24 of a metal backup ring 25. The latter is urged toward the valve member by a compression spring 27 positioned between the backup ring and a nipple 30 forming part of the breakaway mechanism which will be described later.

The use of the two specially contoured bearing seals preloaded against the valve member by the compression spring just described provides a valve which requires only a very low actuating torque. In addition, the preloading of the seals compensates for any wear and provides long service life.

Ball valve member 14 is rotated from open to closed position and vice versa by an actuation lever 32. This has two legs 33 and 34 connected by a handle portion 35. Each leg is mounted on a cam plate, leg 33 being secured to plate 37L and leg 34 to plate 37R, the cam plates being left and right counterparts as will later appear. Each cam plate is pivotally mounted on the body 11 and connected to the valve member by a special key 40. The key comprises a central cylindrical section 41 having a groove 42 containing a seal ring 43, the section 41 being journaled in a bore 44 in the valve body. A flange 45 fits in a counterbore 44' is retained by snap ring 46. The key is cut away at each side to form flats 48 at the outer end portion and flats 49 at the inner end portion. The outer end portion closely fits a hole 50 in the cam plate (37L or 37R) corresponding in cross-sectional shape thereto while the inner end portion is received in a recess 52 of the same cross-sectional shape, but oversized to allow for play and thus compensate for any misalignment of the valve member. A snap ring 53 on the outer end of the key is received in a counterbore 54 in the cam plate, serving to secure the parts.

Coupling means is provided at the forward end of the body and this includes a collar 60 and within this a ball cage 61 containing balls 62 which serve to engage in a groove 63 of nipple 12 to which the device is to be joined when the collar is in the position shown in the drawings. When the collar is moved forward or outwardly of the valve body, the balls are free to move radially outward and thus release the device from coupling engagement with the nipple in a manner well known in the art.

Collar 60 is connected to be operated by pivotal movement of the cam plates 37L and 37R through the medium of a cam follower 65 provided at each side of the collar.

Each follower is received in a cam track or groove 66 in the cam plate and thus as the cam plates are turned by the actuation lever the collar is moved.

The actuation lever and cam plates are so designed as to actuate the coupling and the ball valve in sequence. When the actuation lever is moved from the full line position of FIG. 1 to the broken line position thereof, the valve begins to close immediately but during this movement the collar 60 is not moved until near the end of the movement of the lever as will be seen from an inspection of FIGS. 1 and 3 wherein it is apparent that the cam track or groove 66 is concentric about the pivotal axis of the cam plate for a great portion of its length. When the actuation lever is moved in the opposite direction the collar is moved to coupling position before the valve member is turned to open position.

A particular feature of the invention is the provision of means whereby the valve will automatically close and uncouple itself from the nipple 12 when subjected to a pulling force of predetermined magnitude. This is accomplished by the breakaway mechanism which includes the nipple 30 which is mounted within the body 11 for limited axial movement and is restrained against movement by Belleville spring washers 71 effectively positioned between the nipple and the valve body. The washers are located in an annular space 72 between the body and nipple 30. At one end the washers bear against a ring 73 which is held by a retainer ring 74 on the nipple. At the other end the washers bear against a ring 75 which is held by a retaining ring 76 in the body. Ring 75 is provided with inner and outer seal rings 78 and 79 respectively.

On the outside of the body I provide a pair of actuation cables 81. Each cable is mounted at one end in a ring 82 which is seated on the nipple 30 and held by retainer ring 83. The forward end of each cable is provided with a head or cam follower 85 that is received in a groove or track 86 in the cam plate. The latter is provided with an end slot 87 to pass the cable.

With the construction just described it will be apparent that if a force of sufficient magnitude to overcome the force of the spring washers 71 is applied in a direction to pull nipple 30 outwardly of the body 11, the cables 81 will rotate the cam plates 37L and 37R from the position in which they are shown in FIG. 2 to a position such that the actuation lever occupies the broken line position of FIG. 1, thereby closing the valve member and releasing the coupling means in sequence. When the axial load or pull has been relieved, the nipple 30 and its ring 82 return to their normal position and the valve coupling can then be again coupled to a nipple 12 or the like and the valve opened.

I claim:

1. A breakaway coupling valve, comprising an open ended tubular valve body, a valve member in said body with a diametrical fluid passage therethrough, coupling means at one end of the valve body for detachably securing the same to a nipple or the like, valve actuation means movably mounted on the body and operatively connected to rotate the valve member and to operate the coupling means, a tubular breakaway member mounted in said body at the other end thereof and adapted to be connected to a pipeline or the like, said breakaway member being mounted for axial movement relative to said body, means yieldably resisting axial movement of said breakaway member relative to said body, and cable means connected between said breakaway member and said valve actuation means for operating the latter upon movement of said breakaway member relative to said body.

2. The valve set forth in claim 1 in which said valve actuation means is effective to operate said valve member and said coupling means in a predetermined sequence.

3. The valve set forth in claim 1 in which said coupling means includes an axially movable collar, and in which said actuation member is connected to said collar by means of a cam plate and cam follower.

4. The valve set forth in claim 3 in which the cable means is connected to said cam plate.

5. A breakaway type coupling valve, comprising a tubular open ended valve body, a ball-type valve member in said body, coupling means at one end of said body for connecting the same to a nipple or the like, said coupling means including a movably mounted collar member, a breakaway nipple telescopically associated with said body at the other end thereof and mounted for limited axial movement relative thereto, spring means yieldably preventing such relative axial movement, an actuation assembly connected to operate the valve member, said assembly including a cam plate disposed at each side of said body, cam follower means on said collar in operative engagement with said cam plates, and cable means connected between said cam plates and said breakaway nipple whereby to actuate said plates upon movement of said nipple relative to said body.

6. The valve set forth in claim 5 in which each cam plate includes a first groove receiving the follower on the collar member, in which said cable means includes a cable on each side of the body extending from the breakaway nipple to a cam plate, and in which each cam plate has a second groove receiving an enlargement on the end of the cable.

7. The valve set forth in claim 5 in which said actuation assembly includes a manually operable actuation lever having an arm at each side of the body affixed to a cam plate, and in which a key is mounted in each cam plate and received in the valve member for imparting turning movement of the lever and cam plates to the valve member.

8. In a valve, a tubular open-ended valve body, a ball-type valve member in said body with a diametrical fluid passage therethrough, an annular first seal ring supported in said body and engaging one side of said valve member, an annular second seal ring engaging the opposite side of said valve member, a floating backup ring behind said second seal ring, spring means yieldably urging said backup ring toward said valve member, coupling means at one end of said valve body for detachably connecting the same to a nipple or the like, said coupling means including an axially movable collar, a breakaway nipple mounted in the other end of said valve body for limited axial movement, spring means between said breakaway nipple and said valve body yieldably holding the nipple inwardly with respect to the body, a manually operable actuation lever assembly pivotally mounted on the valve body and including an arm at each side of the body having a cam plate fixedly secured thereto, a key connecting each plate with said valve member for turning said valve member in response to pivotal movement of the lever assembly, cam followers on said collar operatively engaging the cam plates respectively of said lever assembly, and a cable connected between each side of said lever assembly and said breakaway nipple.

9. A breakaway coupling valve comprising a tubular open-ended valve body, a ball-type valve member in said body with a diametrical fluid passage therethrough, an annular first seal ring supported in said body and engaging one side of said valve member, an annular second seal ring engaging the opposite side of said valve member, a floating backup ring in said body behind said second seal ring, spring means yieldably urging said backup ring toward said valve member, valve actuation means pivotally mounted on the body for turning said valve member including a key at each side of non-circular cross section at its inner end received in an oversized similarly shaped recess at each side of the valve member, coupling means at one end of said body for detachably securing the same to a nipple or the like connected to for operation by said valve actuation means, a tubular breakaway member mounted in said body at the other end thereof and adapted for limited axial movement relative to said body, means in said body for yieldably restraining said tubular breakaway member against movement, and means connected between said breakaway member and said valve actuation means for operating the latter upon movement of the breakaway member relative to said body.

References Cited

UNITED STATES PATENTS

| | | | |
|---|---|---|---|
| 369,887 | 9/1887 | Smith | 285—1 |
| 1,700,073 | 1/1929 | Parker et al. | 251—149.9 |
| 2,533,640 | 12/1950 | Ulrich | 137—614.04 |
| 2,824,755 | 2/1958 | Lamphear | 251—149.2 |
| 3,407,847 | 10/1968 | Snyder | 137—614.06 |

M. CARY NELSON, Primary Examiner

R. B. ROTHMAN, Assistant Examiner

U.S. Cl. X.R.

285—1